(12) United States Patent
Bergquist

(10) Patent No.: US 10,375,654 B2
(45) Date of Patent: Aug. 6, 2019

(54) SCHEDULING, POWER CONTROL AND LINK ADAPTATION BASED ON COMMUNICATION BETWEEN USER EQUIPMENT AND NETWORK

(71) Applicant: TELEFONAKTIEBOLAGET LM ERICSSON (PUBL), Stockholm (SE)

(72) Inventor: Gunnar Bergquist, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/577,360

(22) PCT Filed: May 30, 2016

(86) PCT No.: PCT/SE2016/050495
§ 371 (c)(1),
(2) Date: Nov. 28, 2017

(87) PCT Pub. No.: WO2016/195575
PCT Pub. Date: Dec. 8, 2016

(65) Prior Publication Data
US 2018/0160378 A1    Jun. 7, 2018

Related U.S. Application Data

(60) Provisional application No. 62/170,258, filed on Jun. 3, 2015.

(51) Int. Cl.
*H04W 52/32*    (2009.01)
*H04L 1/00*    (2006.01)
(Continued)

(52) U.S. Cl.
CPC ............. *H04W 52/325* (2013.01); *H04L 1/00* (2013.01); *H04W 72/12* (2013.01);
(Continued)

(58) Field of Classification Search
None
See application file for complete search history.

(56) References Cited

U.S. PATENT DOCUMENTS

2010/0067498 A1* 3/2010 Lee ................... H04W 74/006
370/336
2013/0294363 A1* 11/2013 Feng .................. H04W 74/008
370/329
(Continued)

FOREIGN PATENT DOCUMENTS

EP    2645758 A1    10/2013

OTHER PUBLICATIONS

International Search report dated Aug. 11, 2016, for International Application No. PCT/SE2016/050495, International Filing Date: May 30, 2016, consisting of 4 pages.
(Continued)

*Primary Examiner* — Fayyaz Alam

(57) ABSTRACT

A wireless communication device transmits a control message indicating a request for initial device and application-specific configuration parameters for a connection with a radio access node, receives acknowledgement of the control message from the radio access node responsive to the control message, and applies the initial device and application-specific configuration parameters for the connection in response to receiving the acknowledgement.

30 Claims, 19 Drawing Sheets

(51) Int. Cl.
*H04W 74/00* (2009.01)
*H04W 74/08* (2009.01)
*H04W 72/12* (2009.01)
*H04W 88/02* (2009.01)
*H04W 88/08* (2009.01)

(52) U.S. Cl.
CPC ..... *H04W 74/004* (2013.01); *H04W 74/0833* (2013.01); *H04W 88/02* (2013.01); *H04W 88/08* (2013.01)

(56) References Cited

U.S. PATENT DOCUMENTS

2014/0098761 A1* 4/2014 Lee .................. H04W 74/006 370/329
2016/0192435 A1* 6/2016 Gupta ................ H04B 15/00 370/311

OTHER PUBLICATIONS

Written Opinion dated Aug. 11, 2016, for International Application No. PCT/SE2016/050495, International Filing Date: May 30, 2016, consisting of 7 pages.

* cited by examiner

*ReportConfigEUTRA information element*

```
ReportConfigEUTRA ::=                    SEQUENCE {
    triggerType                              CHOICE {
        event                                    SEQUENCE {
            eventId                                  CHOICE {
                eventA1                                  SEQUENCE {
                    a1-Threshold                             ThresholdEUTRA
                },
                eventA2                                  SEQUENCE {
                    a2-Threshold                             ThresholdEUTRA
                },
                eventA3                                  SEQUENCE {
                    a3-Offset                                INTEGER (-30..30),
                    reportOnLeave                            BOOLEAN
                },
                eventA4                                  SEQUENCE {
                    a4-Threshold                             ThresholdEUTRA
                },
                eventA5                                  SEQUENCE {
                    a5-Threshold1                            ThresholdEUTRA,
                    a5-Threshold2                            ThresholdEUTRA
                },
                ...
                eventA6-r10                              SEQUENCE {
                    a6-Offset-r10                            INTEGER (-30..30),
                    a6-ReportOnLeave-r10                     BOOLEAN
                },
                eventC1-r12                              SEQUENCE {
                    c1-Threshold-r12                         ThresholdEUTRA-v12xy,
                    c1-ReportOnLeave-r12                     BOOLEAN
                },
                eventC2-r12                              SEQUENCE {
                    c2-RefCSI-RS-r12                         MeasCSI-RS-Id-r12,
                    c2-Offset-r12                            INTEGER (-30..30),
                    c2-ReportOnLeave-r12                     BOOLEAN
                }
            },
            hysteresis                               Hysteresis,
            timeToTrigger                            TimeToTrigger
        },
        periodical                               SEQUENCE {
            purpose                                  ENUMERATED {
                                                         reportStrongestCells, reportCGI}
        }
    },
    triggerQuantity                          ENUMERATED {rsrp, rsrq},
    reportQuantity                           ENUMERATED {sameAsTriggerQuantity, both},
    maxReportCells                           INTEGER (1..maxCellReport),
    reportInterval                           ReportInterval,
    reportAmount                             ENUMERATED {r1, r2, r4, r8, r16, r32, r64, infinity},
    ...
    [[  si-RequestForHO-r9                      ENUMERATED {setup}      OPTIONAL,    -- Cond reportCGI
        ue-RxTxTimeDiffPeriodical-r9            ENUMERATED {setup}      OPTIONAL     -- Need OR
    ]],
    [[  includeLocationInfo-r10                 ENUMERATED {true}       OPTIONAL,    -- Need OR
        reportAddNeighMeas-r10                  ENUMERATED {setup}      OPTIONAL     -- Need OR
    ]],
    [[  alternativeTimeToTrigger-r12            TimeToTrigger           OPTIONAL,    -- Need OR
        useT312-r12                             ENUMERATED {setup}      OPTIONAL,    -- Cond event
        usePSCell-r12                           ENUMERATED {true}       OPTIONAL,    -- Cond a3OrA5
        aN-Threshold1-v12xy                     RSRQ-Range-v12xy        OPTIONAL,    -- Need OR
        a5-Threshold2-v12xy                     RSRQ-Range-v12xy        OPTIONAL,    -- Need OR
        reportStrongestCSI-RSs-r12              ENUMERATED {true}       OPTIONAL,    -- Cond periodic
        reportCRS-Meas-r12                      ENUMERATED {true}       OPTIONAL,    -- Need OR
        triggerQuantityCSI-RS-r12               ENUMERATED {csi-RSRP-r12} OPTIONAL   -- Cond CSI-RS
    ]]
}
```

FIG. 17

SCHEDULING, POWER CONTROL AND LINK ADAPTATION BASED ON COMMUNICATION BETWEEN USER EQUIPMENT AND NETWORK

CROSS-REFERENCE TO RELATED APPLICATIONS

This application claims priority to U.S. Provisional Patent Application No. 62/170,258 filed on Jun. 3, 2015, the disclosure of which is hereby incorporated by reference in its entirety.

TECHNICAL FIELD

The disclosed subject matter relates generally to telecommunications, and more particularly to scheduling, power control, and link adaptation based on communication between a user equipment and a network.

BACKGROUND

In communication networks such as those based on Long Term Evolution (LTE) as specified by the Third Generation Partnership Project (3GGP), there are certain data layer functions designed for mass communication with a large number of wireless devices, commonly referred to as "user equipments" (UEs). Some data layer functions are designed for peer-to-peer control of transport channels and for mapping between transport channels and logical channels. Examples of such functions include those used by the Radio Resource Control (RRC) protocol.

According to the Evolved Packet System (EPS) defined by the 3GPP LTE architecture, the radio access network is referred to as an Evolved Universal Terrestrial Radio Access Network (E-UTRAN). The E-UTRAN includes base stations, referred to as eNodeBs (eNBs) that provide E-UTRA user-plane and control-plane protocol terminations towards the UEs. User-plane protocol examples include Packet Data Convergence Protocol (PDCP), Radio Link Control (RLC), Medium Access Control (MAC), and Physical Layer (PHY), while control-plane protocol examples include RRC.

The eNBs are connected by an "S1" interface to a core network, which is referred to as an Evolved Packet Core (EPC). More specifically, the eNBs have S1 connections to a Mobility Management Entity (MME), through an S1-MME interface and to a Serving Gateway (S-GW), through an S1-U interface. Upon request from an MME, an eNB performs an E-RAB to radio bearer mapping and establishes a Data Radio Bearer and allocates the required resources on the air interface, referred to as the "Uu" interface. The eNB also sets up a logical channel for the UE and allocates it to a transport channel. These operations involve the MAC layer.

3GPP specifies the E-UTRAN MAC protocol as a sub-layer of layer 2. Functions of the MAC sublayer are performed by MAC entities in the UE and in the E-UTRAN. For a MAC entity configured at the eNB, there is a peer MAC entity configured at the UE and vice versa.

A mapping of logical channels to transport channels at the MAC sublayer is configured by RRC signaling. There is one Logical Channel Identifier (LCD) field for each MAC service data unit (SDU) included in the corresponding MAC protocol data unit (PDU). The LCID field size is 5 bits, where the value 00000 is reserved for CCCH and the value 11111 is reserved for padding. The LCID for the Downlink Shared Channel (DL-SCH) uses the range 11000-11110 for MAC Control Elements (MAC CEs). A MAC CE is an explicit MAC in-band control message. The range 01011-10111 is reserved for future needs within the framework of the controlling standard. Similarly, the LCID for the Uplink (UL) Shared Channel (UL-SCH) uses the range 10110-11110 for explicit MAC in-band control, while the range 01100-10101 is reserved for future needs within the standard.

SUMMARY

In some embodiments of the disclosed subject matter, a method in a wireless communication device comprises transmitting a control message indicating a request for initial device and application-specific configuration parameters for a connection with a radio access node, receiving acknowledgement of the control message from the radio access node responsive to the control message, and applying the initial device and application-specific configuration parameters for the connection in response to receiving the acknowledgement.

In certain related embodiments, the method further comprises receiving a broadcasted message specifying a type and software version of the radio access node and a list of device and application specific functions supported by the radio access node, verifying compatibility of the specified type and software version of the radio access node with the wireless communication device, and transmitting the control message in response to verifying the compatibility.

In certain related embodiments, the method further comprises transmitting a second control message indicating a request to use at least one of the listed device and application specific functions and to engage in a protocol associated with the at least one of the listed device and application specific functions.

In certain related embodiments, the method further comprises receiving an acknowledgment of the second control message from the radio access node responsive to the request in the second control message, and applying the protocol associated with the at least one of the device and application-specific functions.

In certain related embodiments, the control message is a Msg3 in a random access procedure for initial access to the radio access node.

In certain related embodiments, the control message is a Msg3 in a random access procedure for handover from a source eNodeB to a target eNodeB.

In certain related embodiments, the control message is a Msg3 having a header with a logical channel identifier (LCID) selected from among 9, 10, 22, 23, 29, 29 and 30.

In certain related embodiments, the initial device and application specific configuration parameters control at least one of scheduling, power consumption, and link adaptation.

In certain related embodiments, the second control message further indicates at least one capability, type, and software version of the wireless communication device.

In some embodiments, a method in a radio access node comprises receiving a control message indicating a request for initial device and application-specific configuration parameters for a connection with a wireless communication device, transmitting an acknowledgement of the control message to the wireless communication device in response to the control message, and applying the initial device and application-specific configuration parameters for the connection in response to receiving the control message.

In certain related embodiments, the method further comprises transmitting a broadcasted message specifying a type and software version of the radio access node and a list of device and application specific functions supported by the radio access node, wherein the control message is transmitted by the wireless communication device in response to the broadcasted message.

In certain related embodiments, the method further comprises receiving a second control message from the wireless communication device indicating a request to use at least one of the listed device and application specific functions and to engage in a protocol associated with the at least one of the listed device and application specific functions.

In certain related embodiments, the method further comprises transmitting an acknowledgment of the second control message to the wireless communication device in response to the request in the second control message, and applying the protocol associated with the at least one of the device and application-specific functions.

In certain related embodiments, the control message is a Msg3 in a random access procedure for initial access to the radio access node.

In certain related embodiments, the control message is a Msg3 in a random access procedure for handover from a source eNodeB to a target eNodeB.

In certain related embodiments, the control message is a Msg3 having a header with a logical channel identifier (LCID) selected from among 9, 10, 22, 23, 29, 29 and 30.

In certain related embodiments, the initial device and application specific configuration parameters control at least one of scheduling, power consumption, and link adaptation.

In certain related embodiments, the second control message further indicates at least one capability, type, and software version of the wireless communication device.

In some embodiments, a wireless communication device comprises a transmitter configured to transmit a control message indicating a request for initial device and application-specific configuration parameters for a connection with a radio access node, a receiver configured to receive acknowledgement of the control message from the radio access node responsive to the control message, and a processor configured to apply the initial device and application-specific configuration parameters for the connection in response to receiving the acknowledgement.

In certain related embodiments, the receiver is further configured to receive a broadcasted message specifying a type and software version of the radio access node and a list of device and application specific functions supported by the radio access node, the processor is further configured to verify compatibility of the specified type and software version of the radio access node with the wireless communication device, and the transmitter is further configured to transmit the control message in response to verifying the compatibility.

In certain related embodiments, the transmitter is further configured to transmit a second control message indicating a request to use at least one of the listed device and application specific functions and to engage in a protocol associated with the at least one of the listed device and application specific functions.

In certain related embodiments, the receiver is further configured to receive an acknowledgment of the second control message from the radio access node responsive to the request in the second control message, and the processor is further configured to apply the protocol associated with the at least one of the device and application-specific functions.

In certain related embodiments, the control message is a Msg3 in a random access procedure for initial access to the radio access node.

In certain related embodiments, the control message is a Msg3 in a random access procedure for handover from a source eNodeB to a target eNodeB.

In certain related embodiments, the control message is a Msg3 having a header with a logical channel identifier (LCID) selected from among 9, 10, 22, 23, 29, 29 and 30.

In certain related embodiments, the initial device and application specific configuration parameters control at least one of scheduling, power consumption, and link adaptation.

In certain related embodiments, the second control message further indicates at least one capability, type, and software version of the wireless communication device.

In some embodiments, a radio access node comprises a receiver configured to receive a control message indicating a request for initial device and application-specific configuration parameters for a connection with a wireless communication device, a transmitter configured to transmit an acknowledgement of the control message to the wireless communication device in response to the control message, and at least one processor configured to apply the initial device and application-specific configuration parameters for the connection in response to receiving the control message.

In certain related embodiments, the transmitter is further configured to transmit a broadcasted message specifying a type and software version of the radio access node and a list of device and application specific functions supported by the radio access node, wherein the control message is transmitted by the wireless communication device in response to the broadcasted message.

In certain related embodiments, the receiver is further configured to receive a second control message from the wireless communication device indicating a request to use at least one of the listed device and application specific functions and to engage in a protocol associated with the at least one of the listed device and application specific functions.

In certain related embodiments, the transmitter is further configured to transmit an acknowledgment of the second control message to the wireless communication device in response to the request in the second control message, and the processor is further configured to apply the protocol associated with the at least one of the device and application-specific functions.

In certain related embodiments, the control message is a Msg3 in a random access procedure for initial access to the radio access node.

In certain related embodiments, the control message is a Msg3 in a random access procedure for handover from a source eNodeB to a target eNodeB.

In certain related embodiments, the control message is a Msg3 having a header with a logical channel identifier (LCID) selected from among 9, 10, 22, 23, 29, 29 and 30.

In certain related embodiments, the initial device and application specific configuration parameters control at least one of scheduling, power consumption, and link adaptation.

In certain related embodiments, the second control message further indicates at least one capability, type, and software version of the wireless communication device.

In some embodiments, a wireless communication device comprises a control message transmission module configured to transmit a control message indicating a request for initial device and application-specific configuration parameters for a connection with a radio access node, an acknowledgement reception module configured to receive acknowledgement of the control message from the radio access node responsive to the control message, and a parameter application module configured to apply the initial device and application-specific configuration parameters for the connection in response to receiving the acknowledgement.

In certain related embodiments, the wireless communication device further comprises a broadcast message reception module configured to receive a broadcasted message specifying a type and software version of the radio access node and a list of device and application specific functions supported by the radio access node, and a compatibility verification module configured to verify compatibility of the specified type and software version of the radio access node with the wireless communication device, wherein the control message transmission module is further configured to transmit the control message in response to verifying the compatibility.

In certain related embodiments, the wireless communication device further comprises a second control message transmission module configured to transmit a second control message indicating a request to use at least one of the listed device and application specific functions and to engage in a protocol associated with the at least one of the listed device and application specific functions.

In certain related embodiments, the wireless communication device further comprises a second acknowledgement reception module configured to receive an acknowledgment of the second control message from the radio access node responsive to the request in the second control message, and a protocol application module configured to apply the protocol associated with the at least one of the device and application-specific functions.

In certain related embodiments, the control message is a Msg3 in a random access procedure for initial access to the radio access node.

In certain related embodiments, the control message is a Msg3 in a random access procedure for handover from a source eNodeB to a target eNodeB.

In certain related embodiments, the control message is a Msg3 having a header with a logical channel identifier (LCID) selected from among 9, 10, 22, 23, 29, 29 and 30.

In certain related embodiments, the initial device and application specific configuration parameters control at least one of scheduling, power consumption, and link adaptation.

In certain related embodiments, the second control message further indicates at least one capability, type, and software version of the wireless communication device.

In some embodiments, a radio access node comprises a control message reception module configured to receive a control message indicating a request for initial device and application-specific configuration parameters for a connection with a wireless communication device, an acknowledgement transmission module configured to transmit an acknowledgement of the control message to the wireless communication device in response to the control message, and a parameter application module configured to apply the initial device and application-specific configuration parameters for the connection in response to receiving the control message.

In certain related embodiments, the radio access node further comprises a broadcast message transmission module configured to transmit a broadcasted message specifying a type and software version of the radio access node and a list of device and application specific functions supported by the radio access node, wherein the control message is transmitted by the wireless communication device in response to the broadcasted message.

In certain related embodiments, the radio access node further comprises a second control message reception module configured to receive a second control message from the wireless communication device indicating a request to use at least one of the listed device and application specific functions and to engage in a protocol associated with the at least one of the listed device and application specific functions.

In certain related embodiments, the radio access node further comprises a second acknowledgement transmission module configured to transmit an acknowledgment of the second control message to the wireless communication device in response to the request in the second control message, and a protocol application module configured to apply the protocol associated with the at least one of the device and application-specific functions.

In certain related embodiments, the control message is a Msg3 in a random access procedure for initial access to the radio access node.

In certain related embodiments, the control message is a Msg3 in a random access procedure for handover from a source eNodeB to a target eNodeB.

In certain related embodiments, the control message is a Msg3 having a header with a logical channel identifier (LCID) selected from among 9, 10, 22, 23, 29, 29 and 30.

In certain related embodiments, the initial device and application specific configuration parameters control at least one of scheduling, power consumption, and link adaptation.

In certain related embodiments, the second control message further indicates at least one capability, type, and software version of the wireless communication device.

BRIEF DESCRIPTION OF THE DRAWINGS

The drawings illustrate selected embodiments of the disclosed subject matter. In the drawings, like reference labels denote like features.

FIG. 17 shows an ASN.1 description for a ReportConfigEUTRA information element (IE) according to an embodiment of the disclosed subject matter.

DETAILED DESCRIPTION

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Certain embodiments are presented in recognition of shortcomings associated with conventional approaches, such as the following. In conventional approaches, a UE does not have an effective way to communicate current application requirements to the network nor is it possible for UE to postpone non-critical application related network activities to a future more suitable time. Additionally, the policy used by most network operators is indifferent to application requirements and handles all internet data merged onto the default bearer with the same scheduling and radio bearer realizations. Also, the common control channel (CCCH) access does not distinguish a purpose of the connection. Finally, scheduling, power control and link adaptation policies typically do not distinguish the purpose of the connection.

In certain embodiments described below, certain approaches are presented to facilitate scheduling, power control and link adaptation according to agreements between a UE and a network. The described embodiments may provide potential benefits such as reduced power consumption and/or latency.

The described embodiments may be implemented in any appropriate type of communication system supporting any suitable communication standards and using any suitable components. As one example, certain embodiments may be implemented in an LTE network, such as that illustrated in FIG. 1.

Figure 1:
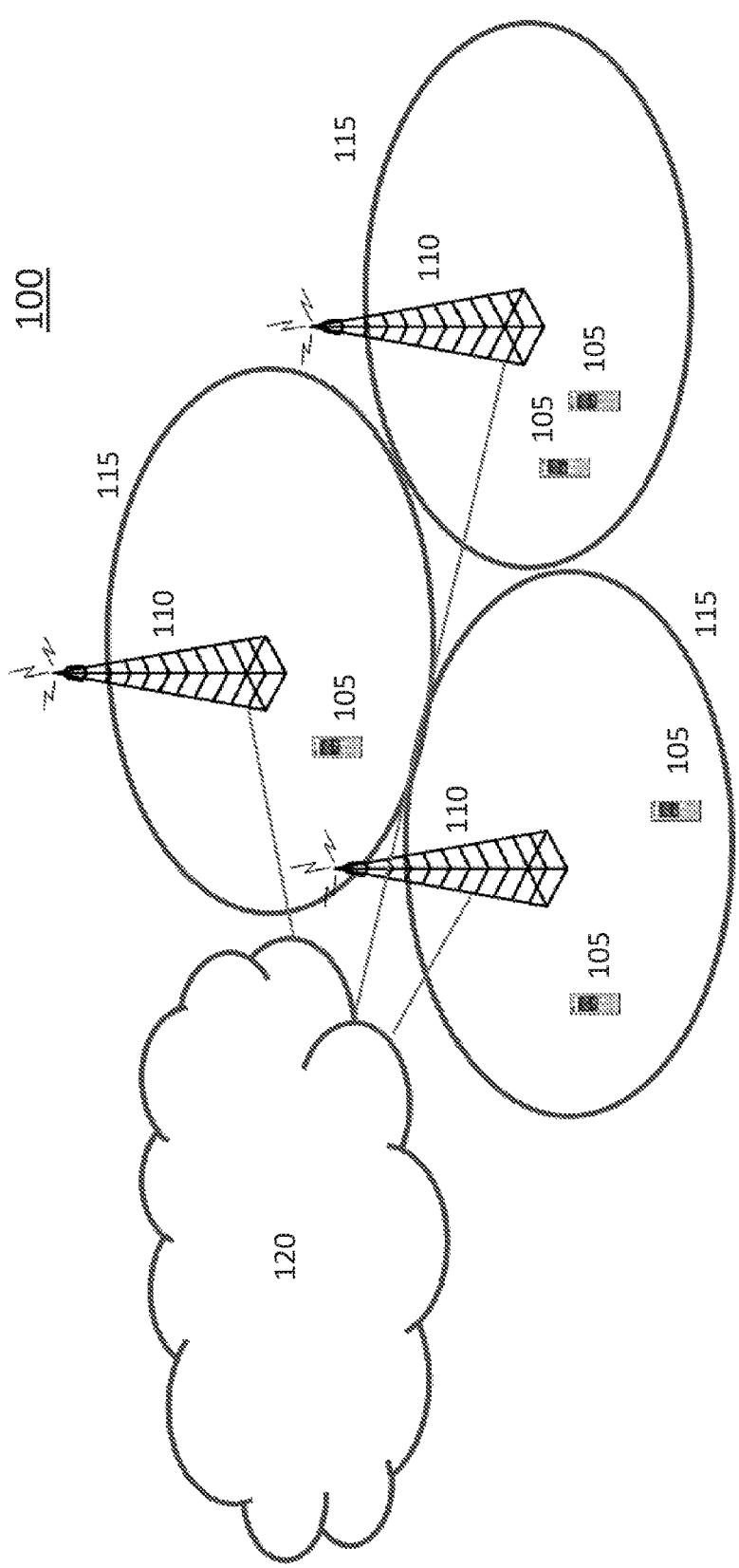
FIG. 1 is a diagram illustrating an LTE network according to an embodiment of the disclosed subject matter.

Referring to FIG. 1, a communication network 100 comprises a plurality of wireless communication devices 105 (e.g., conventional UEs, machine type communication [MTC]/machine-to-machine [M2M] UEs) and a plurality of radio access nodes 110 (e.g., eNodeBs or other base stations). Communication network 100 is organized into cells 115, which are connected to a core network 120 via corresponding radio access nodes 110. Radio access nodes 110 are capable of communicating with wireless communication devices 105 along with any additional elements suitable to support communication between wireless communication devices or between a wireless communication device and another communication device (such as a landline telephone).

Figure 2:
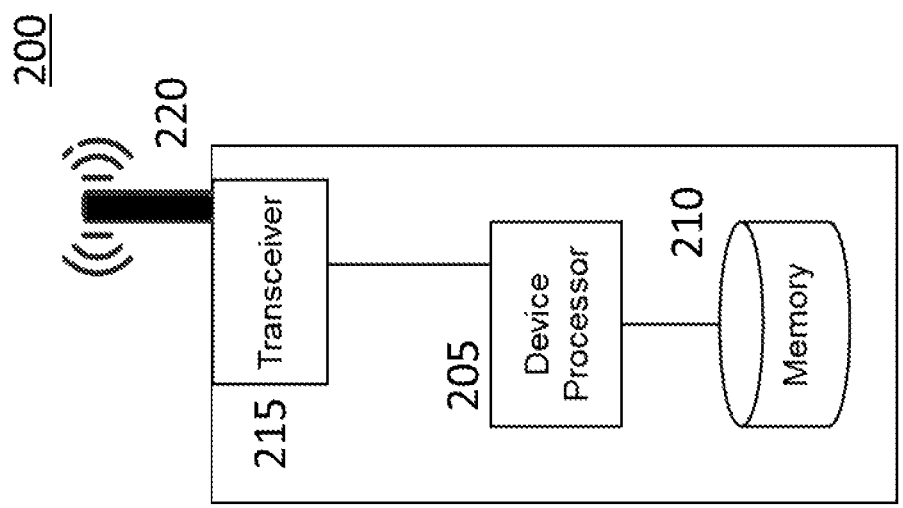
FIG. 2 is a diagram illustrating a wireless communication device according to an embodiment of the disclosed subject matter.

Although wireless communication devices 105 may represent communication devices that include any suitable combination of hardware and/or software, these wireless communication devices may, in certain embodiments, represent devices such as an example wireless communication device illustrated in greater detail by FIG. 2. Similarly, although the illustrated radio access node may represent network nodes that include any suitable combination of hardware and/or software, these nodes may, in particular embodiments, represent devices such as the example radio access node illustrated in greater detail by FIG. 3.

Referring to FIG. 2, a wireless communication device 200 comprises a processor 205, a memory, a transceiver 215, and an antenna 220. In certain embodiments, some or all of the functionality described as being provided by UEs, MTC or M2M devices, and/or any other types of wireless communication devices may be provided by the device processor executing instructions stored on a computer-readable medium, such as the memory shown in FIG. 2. Alternative embodiments may include additional components beyond those shown in FIG. 2 that may be responsible for providing certain aspects of the device's functionality, including any of the functionality described herein.

Figure 3:
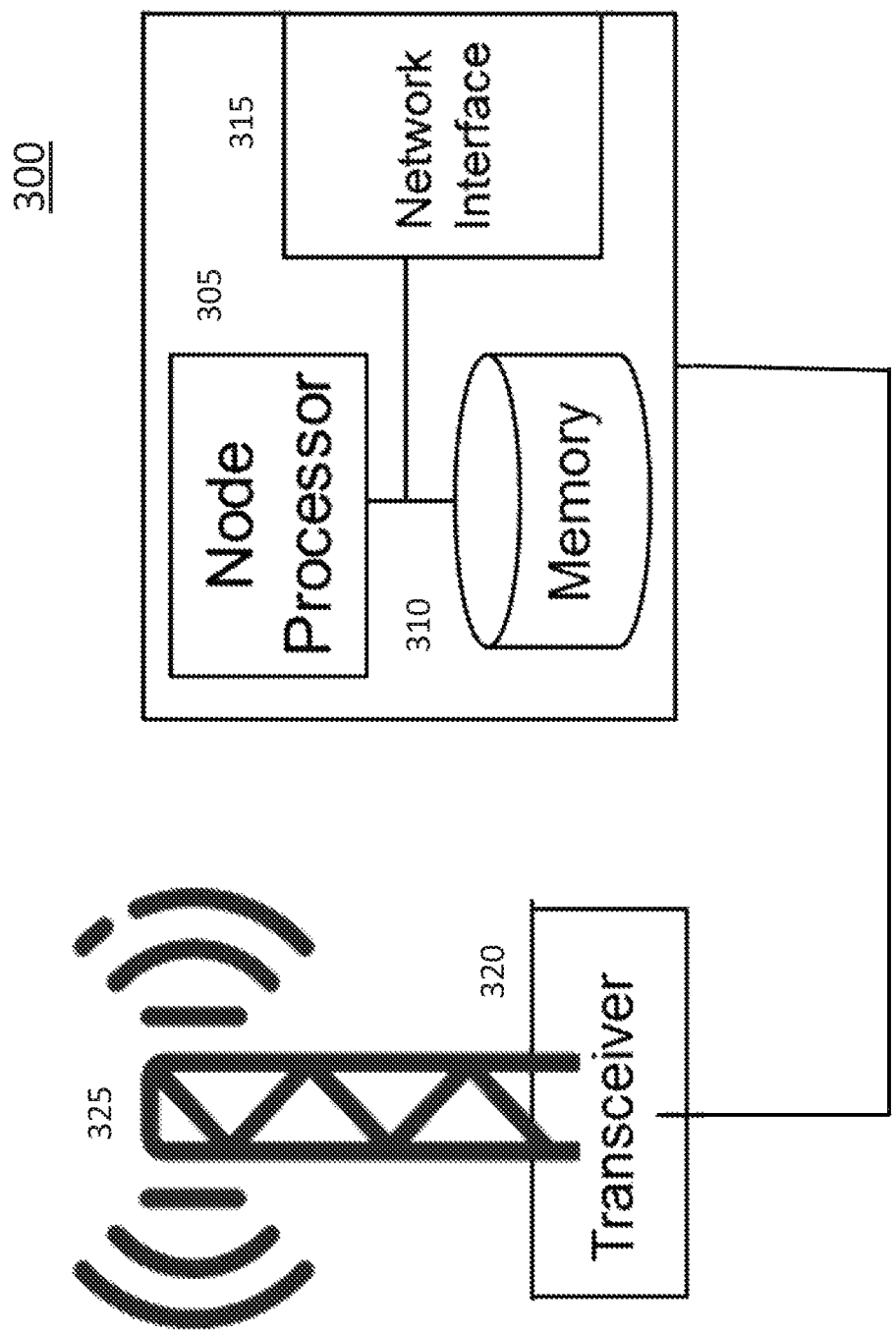
FIG. 3 is a diagram illustrating a radio access node according to an embodiment of the disclosed subject matter.

Referring to FIG. 3, a radio access node 300 comprises a node processor 305, a memory 310, a network interface 315, a transceiver 320, and an antenna 325. In certain embodiments, some or all of the functionality described as being provided by a base station, a node B, an eNB, and/or any other type of network node may be provided by node processor 305 executing instructions stored on a computer-readable medium, such as memory 310 shown in FIG. 3. Alternative embodiments of radio access node 300 may comprise additional components to provide additional functionality, such as the functionality described herein and/or related supporting functionality.

Figure 4:
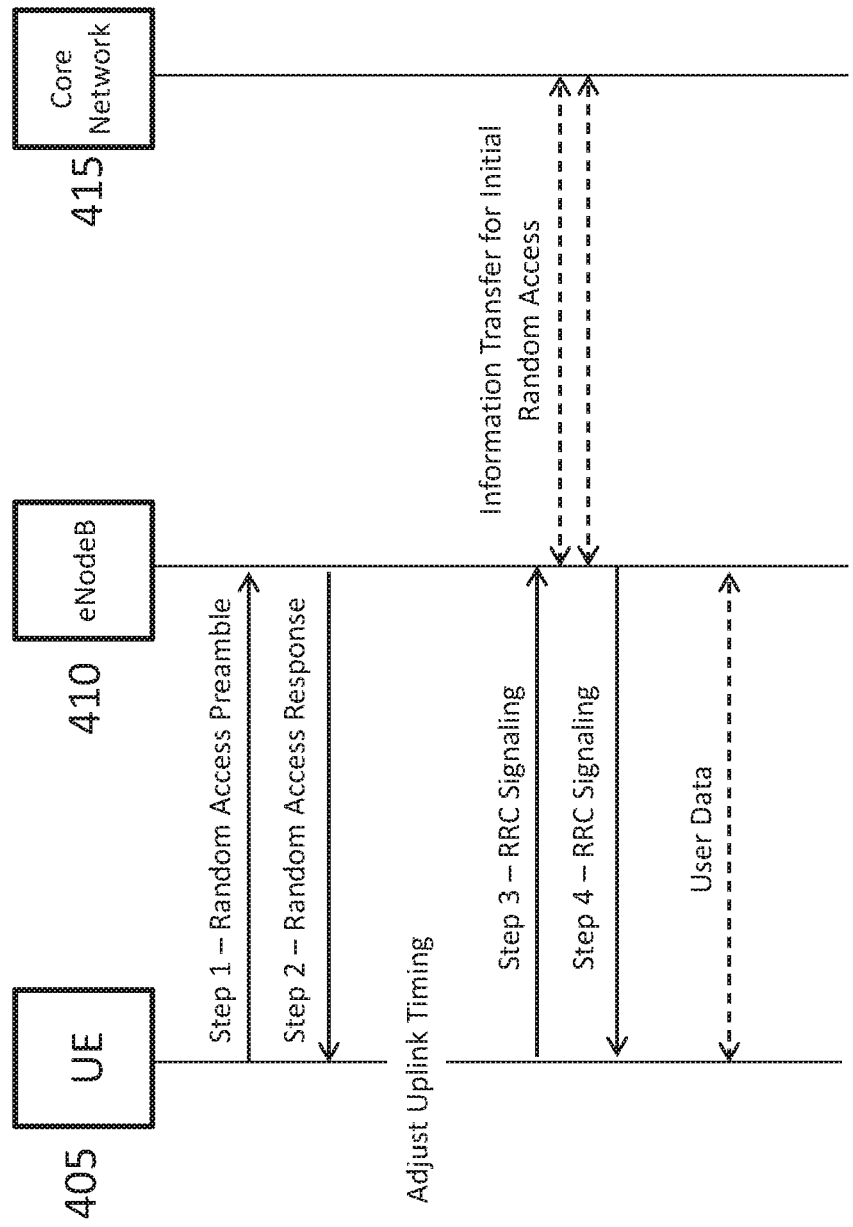
FIG. 4 is a signaling diagram illustrating a random access procedure according to an embodiment of the disclosed subject matter.

Certain embodiments may be implemented in relation to a random access process such as that illustrated in FIG. 4. As illustrated in FIG. 4, the random access process comprises Steps 1-4 in which a UE 405 establishes a connection with an eNB 410. In the case of initial random access (i.e., where the UE is not already identified to the eNB), the random access process may further comprise information transfer from the eNB 410 to a core network 415. Notably, the random access process of FIG. 4 is a contention-based random access process. In a contention-free random access process, Steps 3-4 may be omitted and Steps 1-2 may be modified. Various additional aspects described and illustrated in relation to FIG. 4 may be modified, omitted, or expanded upon, as will be apparent to those skilled in the art. For example, the order of certain operations may be changed, or certain operations may be performed by signaling that differs from that described or illustrated in relation to FIG. 4.

In Step 1, UE 405 transmits a random access preamble to eNB 410. Among other things, the transmission of the random-access preamble allows eNB 410 to estimate the transmission timing of UE 405 for uplink synchronization, and it also allows eNB 410 to determine the classification of UE 410.

In Step 2, eNB 410 transmits a random access response to UE 405. The response typically includes a timing advance command to adjust the transmission timing of UE 405, based on the timing estimate obtained in Step 1. In addition, Step 2 also assigns uplink resources to UE 405 to be used in Step 3. The assignment of uplink resources may be determined, at least in part, by the classification of UE 405.

In Step 3, UE 405 transmits a mobile-terminal identity to eNB 4 using UL-SCH similar to normal scheduled data. The content of the signaling generally depends on the state of the UE 405, such as whether it is already known to the network. Additionally, UE 405 transmits an LCID value to eNB 410. Then, in Step 4, eNB 4 transmits a contention resolution message to UE 405 on DL-SCH. A message transmitted in Step 3 is commonly referred to as "Message 3" or simply "Msg3".

After the UE is connected to the eNB there is great flexibility for the eNB to realize the transport of data between the UE and the network, as illustrated by a dotted two-way arrow in FIG. 4. Moreover, as indicated above, UEs in mobile communications networks may have different radio access capabilities, such as number of receive antennas, maximum number of layers for uplink transmission, maximum data rates in uplink and downlink, that characterize how data can be transferred and that the eNB need to know. In E-UTRA, most capabilities are conveyed from the UE to the eNB in an RRC UECapabilityInformation message that is sent upon request from the eNB, as illustratively shown in FIG. 4.

Figure 5:
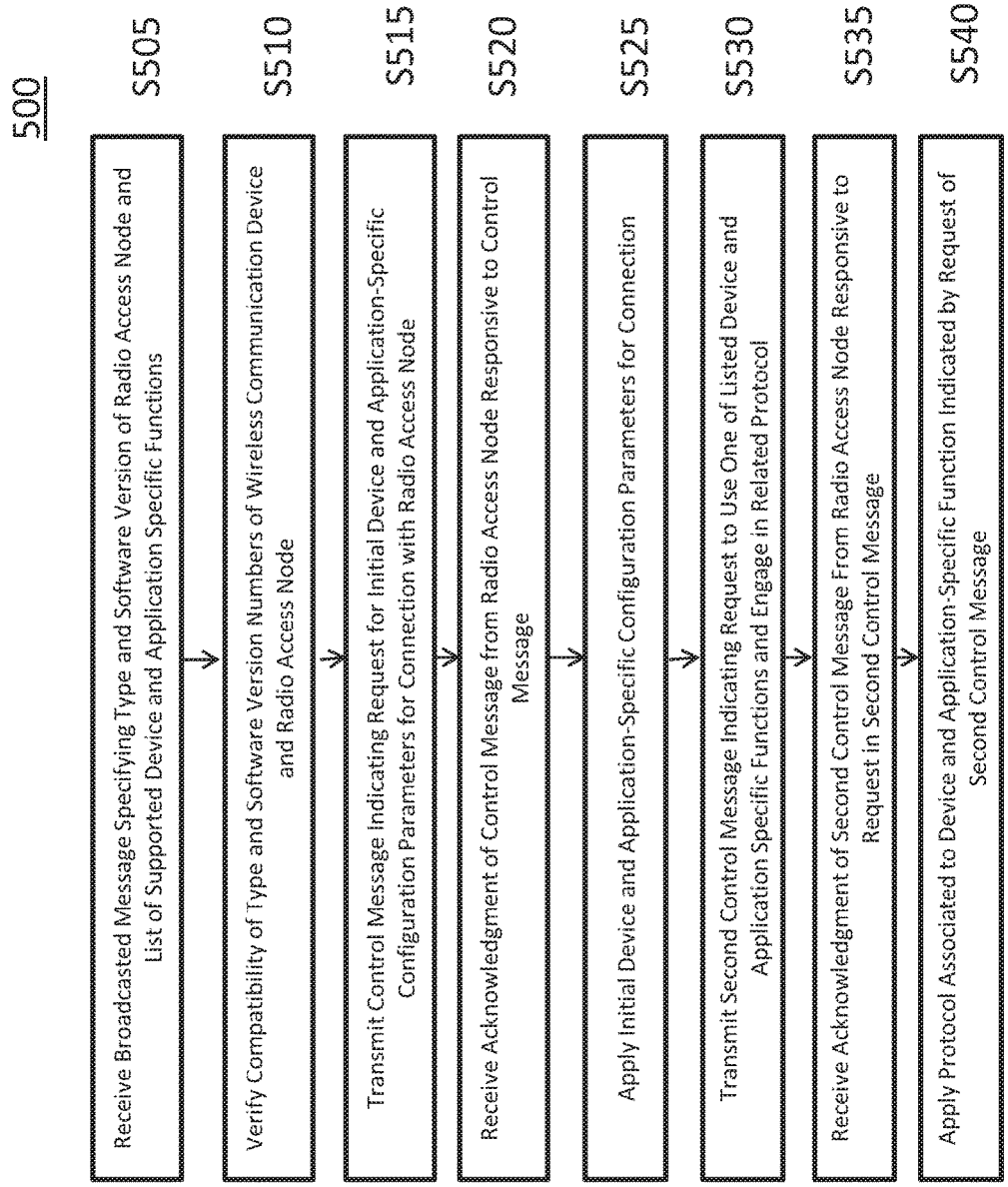
FIG. 5 is a flowchart illustrating a method of operating a wireless communication device according to an embodiment of the disclosed subject matter.

FIG. 5 is a flowchart illustrating a method 500 of operating a wireless communication device according to an embodiment of the disclosed subject matter.

Referring to FIG. 5, the method comprises receiving a broadcasted message specifying a type and software version of a radio access node and a list of device and application specific functions supported by the radio access node (S505), verifying compatibility of the specified type and software version of the radio access node with the wireless communication device (S510), and in response to verifying the compatibility, transmitting a control message indicating a request for initial device and application-specific configuration parameters for a connection with a radio access node (S515), receiving acknowledgement of the control message from the radio access node responsive to the control message (S520), and applying the initial device and application-specific configuration parameters for the connection in response to receiving the acknowledgement (S525).

In this context, the term "initial device and application-specific configuration parameters" refers to parameters that govern to wireless communication device and applications that run on the wireless communication device. Such parameters may include, for instance, parameters to govern transmit and/or receive power of the wireless communication device and thereby affect the amount and/or quality of information that can be conveyed by applications such as voice communication. As an example, in some embodiments the initial device and application-specific configuration parameters require a wireless communication device to use relatively low transmit power and therefore limit voice applications to relatively low quality. In some related embodiments, the same parameters may also require/indicate that the other party to the connection (e.g., the radio access node) is to use relatively high transmit power due to limitations of a receiver in the wireless communication device. Notably, the initial device and application-specific configuration parameters are not limited to power-related parameters, and could also take the form of parameters for link adaptation and scheduling, to name but a couple of alternatives. In the case of scheduling-related parameters, for instance, the initial device and application-specific configuration parameters may indicate the extent to which an application that runs on the wireless communication device is delay tolerant.

The method further comprises sending a second control message indicating a request to use at least one of the listed device and application specific functions and to engage in a protocol associated with the at least one of the listed device and application specific functions (S530), receiving an acknowledgment of the second control message from the radio access node responsive to the request in the second control message (S535), and applying the protocol associated with the at least one of the device and application-specific functions (S540). In certain embodiments, the second control message further indicates at least one capability, type, and software version of the wireless communication device.

In certain embodiments, the control message is a Msg3 in a random access procedure for initial access to the radio access node. In certain alternative embodiments, the control message is a Msg3 in a random access procedure for handover from a source eNodeB to a target eNodeB. In still other alternative embodiments, the control message is a Msg3 having a header with a logical channel identifier (LCID) selected from among 9, 10, 22, 23, 29, 29 and 30.

In certain embodiments, the initial device and application specific configuration parameters control at least one of scheduling, power consumption, and link adaptation.

Figure 6:
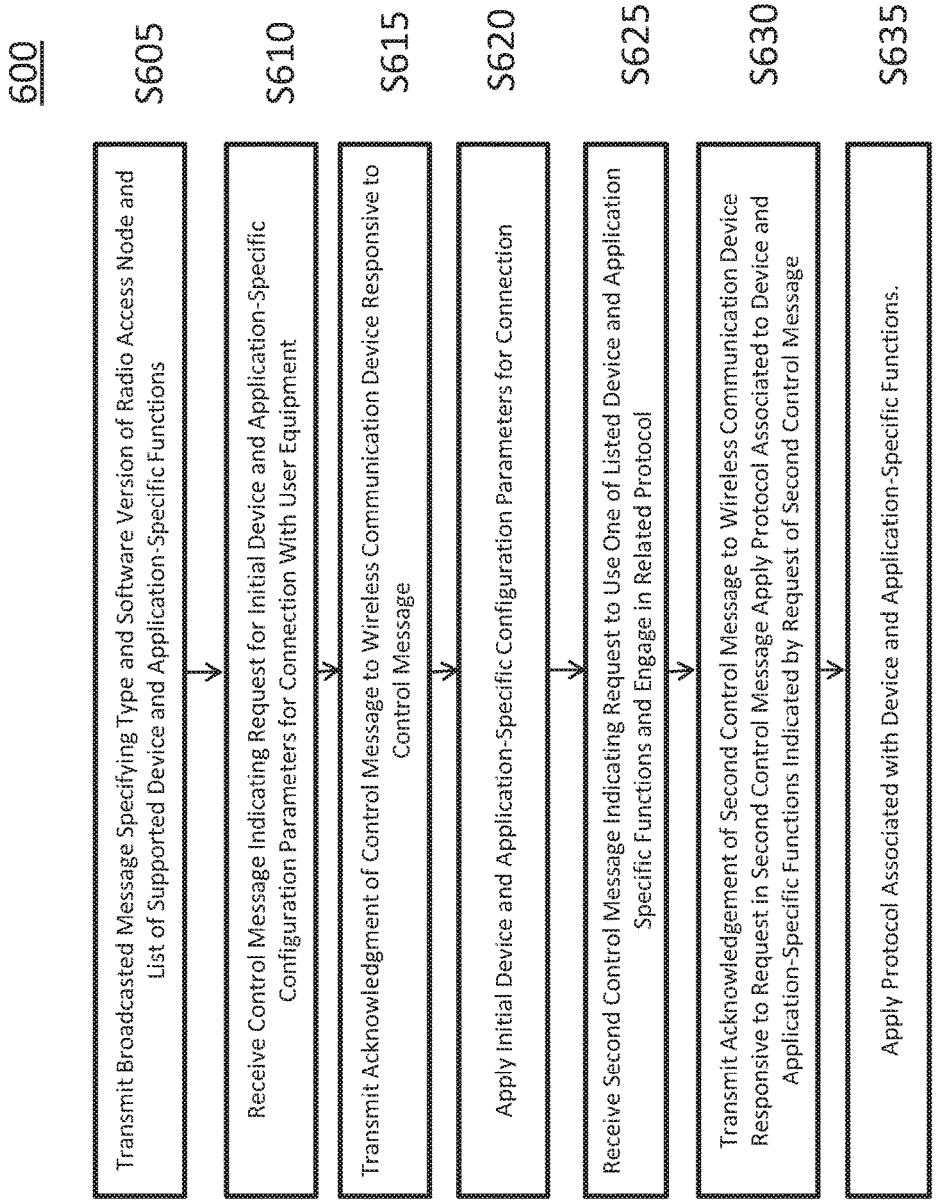
FIG. 6 is a flowchart illustrating a method of operating a radio access node according to an embodiment of the disclosed subject matter.

FIG. 6 is a flowchart illustrating a method 600 of operating a radio access node according to an embodiment of the disclosed subject matter.

Referring to FIG. 6, the method comprises transmitting a broadcasted message specifying a type and software version of the radio access node and a list of device and application specific functions supported by the radio access node (S605), receiving a control message indicating a request for initial device and application-specific configuration parameters for a connection with a wireless communication device (S610), wherein the control message is transmitted by the wireless communication device in response to the broadcasted message, transmitting an acknowledgement of the control message to the wireless communication device in response to the control message (S615), and applying the initial device and application-specific configuration parameters for the connection in response to receiving the control message (S620).

The method further comprises receiving a second control message from the wireless communication device indicating a request to use at least one of the listed device and application specific functions and to engage in a protocol associated with the at least one of the listed device and application specific functions (S625), transmitting an acknowledgment of the second control message to the wireless communication device in response to the request in the second control message (S630), and applying the protocol associated with the at least one of the device and application-specific functions (S635).

In certain embodiments, the control message is a Msg3 in a random access procedure for initial access to the radio access node. In certain alternative embodiments, the control message is a Msg3 in a random access procedure for handover from a source eNodeB to a target eNodeB. In still other alternative embodiments, the control message is a Msg3 having a header with a logical channel identifier (LCID) selected from among 9, 10, 22, 23, 29, 29 and 30.

In certain embodiments, the initial device and application specific configuration parameters control at least one of scheduling, power consumption, and link adaptation.

Figure 7:
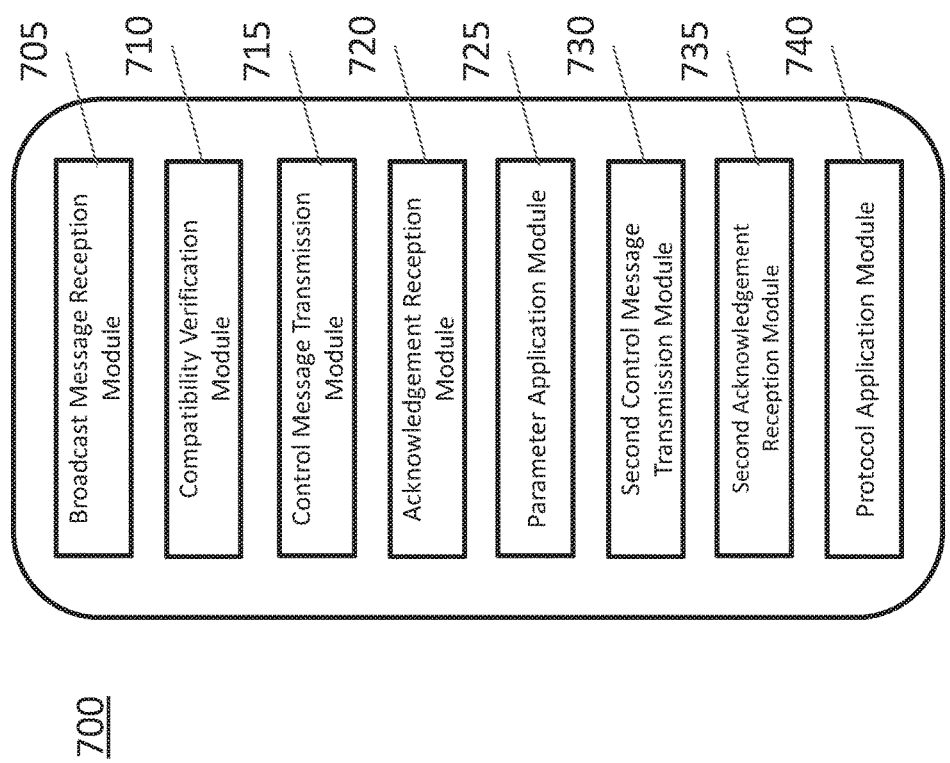
FIG. 7 is a diagram illustrating a wireless communication device according to an embodiment of the disclosed subject matter.

FIG. 7 is a diagram illustrating a wireless communication device 700 according to an embodiment of the disclosed subject matter. In general, wireless communication device 700 may be any apparatus capable of performing a method such as that illustrated in FIG. 5, and it may comprise any suitable combination of hardware and/or software for performing the method. As used in the description of this and other embodiments, the term "module" denotes any suitable combination of hardware and/or software capable of performing the designated functions.

Referring to FIG. 7, wireless communication device 700 comprises a broadcast message reception module 705, a compatibility verification module 710, a control message transmission module 715, an acknowledgement reception module 720, a parameter application module 725, a second control message transmission module 730, a second acknowledgement reception module 735, and a protocol application module 740. Modules 705-740 may be configured to perform respective operations S505-S540 in the method of FIG. 5.

Figure 8:
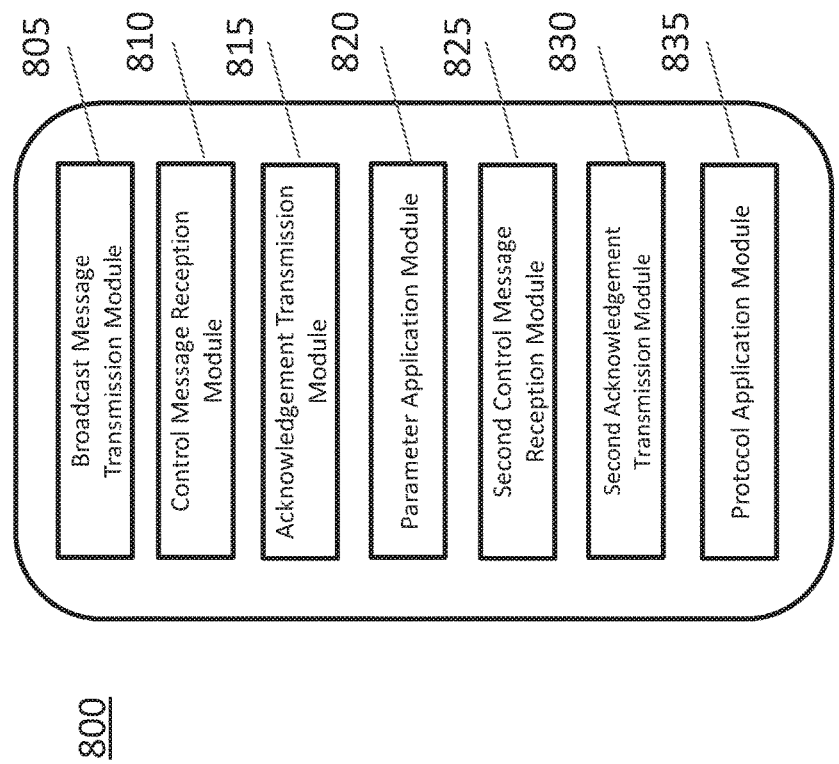
FIG. 8 is a diagram illustrating a radio access node according to an embodiment of the disclosed subject matter.

FIG. 8 is a diagram illustrating a radio access node 800 according to an embodiment of the disclosed subject matter. In general, radio access node 800 may be any apparatus capable of performing a method such as that illustrated in FIG. 6, and it may comprise any suitable combination of hardware and/or software for performing the method.

Referring to FIG. 8, radio access node 800 comprises a broadcast message transmission module 805, a control message reception module 810, an acknowledgement transmission module 815, a parameter application module 820, a second control message reception module 825, a second acknowledgement transmission module 830, and a protocol application module 835. Modules 805-835 may be configured to perform respective operations S705-S735 in the method of FIG. 6.

In certain embodiments, the above-described concepts are used to implement extensions to standard protocols, as will be apparent from the description below. Such extensions may be useful, for instance, for certain strategies for link adaptation and scheduling so that gains can be realized and validated at both ends in terms of drastically reduced power usage and improved latency for the UE, while at same time reducing strain on bottleneck resources on the network side.

The following acronyms are used to identify various features in this description.

PFT: product feature type—identifies feature type (and brand for exclusivity features);

LCD: repurposed logical channel identity in range [8-10] or [22, 23, 28, 29, 30];

A0-RNTI: Radio Network Temporary Identity used to scramble cyclic redundancy check (CRC) of the downlink control information (DCI) on physical downlink control channel (PDCCH);

A1-RNTI: Radio Network Temporary Identity used to scramble physical downlink shared channel (PDSCH);

N-TSVN: a number that identifies type and software version number of the network equipment—the number is coded in 8 bits; and UE-TSVN: a number that identifies the type and software version number of a UE—the number is coded in 8 bits.

The following message types, among others, may be used in certain examples of the methods and apparatuses described with reference to FIGS. 1-8: a PRE-ANNOUNCEMENT message, an ANNOUNCEMENT message, an EARLY NOTIFICATION message, an INITIAL message, and a HANDSHAKE message.

The PRE-ANNOUNCEMENT is an example of a broadcast message as described, e.g., in relation to the methods of FIGS. 5 and 6. This message may contain information used to verify compatibility between a UE and an eNB, for instance. The PRE-ANNOUNCEMENT message is typically contained in a PreAnnouncementBlockType1 which uses a fixed schedule with a periodicity of 80 ms and repetitions made within 80 ms. A first transmission of the PreAnnouncementBlockType1 is scheduled in subframe #6 of radio frames for which the SFN mod 8=0. Repetitions follow in subframe #6 of all other radio frames for which SFN mod 2=0.

The PreAnnouncementBlockType1 is transmitted on DL-SCH. The CRC of the DCI for the message transmitted on PDCCH is scrambled with a first RNTI value A0-RNTI.

A scrambling sequence generator for the PDSCH carrying PreAnnouncementBlockType1 is initialized at the start of each subframe with an initialization value $c_{init}$ defined by the following equation (1).

$$c_{init}=n_{RNTI}2^{14}+q\cdot 2^{13}+\lfloor n_s/2\rfloor\cdot 2^9+N_{ID}^{cell} \quad (1)$$

In equation (1), $n_{RNTI}$=A1-RNTI, which is a second RNTI value.

The PRE-ANNOUNCEMENT and ANNOUNCEMENT messages are both sent by a network. These messages are sent to ensure the UE that the network supports the PFT and the software version used by the UE, and that the network monitors MAC for the possible arrival of the EARLY NOTIFICATION MESSAGE and/or the INITIAL MESSAGE, i.e. messages where UE requests an establishment of a logical channel for a specified PFT.

The PRE-ANNOUNCEMENT message is broadcasted and scheduled to one or more RNTIs of a sort similar to continuous System Information. It is coded in an ASN.1 structure that is embedded as one or more blocks similar to System Information Blocks. The message specifies the type and software version number of the network (N-TSVN) and a range of PFTs that are included in its support.

The ANNOUNCEMENT message is sent dedicated to UE and scheduled to its C-RNTI. It is coded in an ASN.1 structure that is embedded in every message RRCConnectionReconfiguration which specifies the first measurement control in the UE. It specifies the type and software version number of the network (N-TSVN) and a range of PFTs that have been excluded from its support. A SupportedPFTList may be used to specify in a list of 7 bits the PFT values supported (maximum 128). A Minimum-PFT is a variable that specifies in 7 bits the lowest of PFT values supported. Example: any PFT with a value strict smaller than 8 is not supported if Minimum-PFT is set to 0b0001000 (dec 8). As an example, if the variable is set to its minimum value 0b0000000 (dec 0) none of PFTs are excluded. If it is set to its maximum value 0b1111111 (dec 127) only PFT 127 is supported.

The EARLY NOTIFICATION MESSAGE is an example of a control message as described, e.g., in relation to the methods of FIGS. 5 and 6. The EARLY NOTIFICATION MESSAGE is identified by a MAC PDU subheader with a special purpose LCID in Msg3 for Initial Access or Incoming Handover. It has a fixed size of zero bits.

The UE typically does not send the EARLY NOTIFICATION MESSAGE until it has a valid reception of the PRE-ANNOUNCEMENT message and can conclude compatible support of associated PFT, e.g., as in operation S510 of FIG. 5.

The UE uses the N-TSVN to conclude compatible support for any PFT supporting early UE-TSVN identification and refrain from using the PFT unless it can be properly paired with UE-TSVN. The UE uses LCID=<01001> (decimal 9) for any related PFT, as illustrated in the example of FIG. 9.

MAC extensions are judged by a Logical Channel Prioritization procedure when a new transmission is performed. For this purpose, associated PFTs inherit the priority and logicalChannelGroup of the DTCH with highest priority among those that are explicitly established by higher layers. Other logical channel parameters such as prioritisedBitRate, bucketSizeDuration, logicalChannelSR-Mask-r9, logicalChannelSR-Prohibit-r12 do not apply to the MAC extensions.

Figure 9:
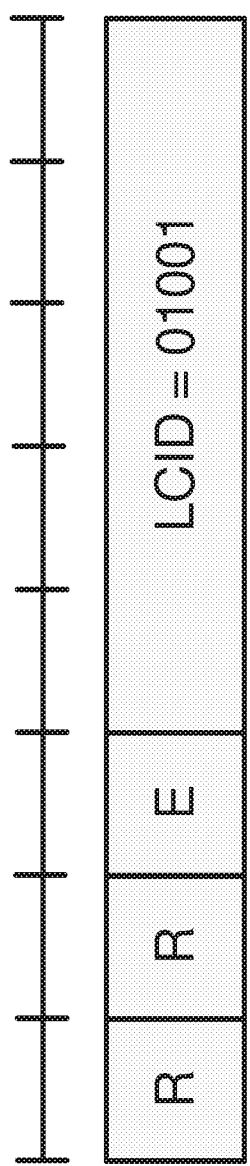
FIG. 9 is a diagram illustrating a MAC header according to an embodiment of the disclosed subject matter.

Different values of LCID can be used as alternatives to the example shown in FIG. 9. For instance, LCID=<01010> (decimal 10) or LCIDs for BSR such as LCID=<10110> (22), LCID=<10111> (23), LCID=<11100> (28), LCD=<11101> (29) and LCID=<11110> (30) could be used under various alternative circumstances. As one example, a UE may use LCID=<01010> (decimal 10) if the PFT is to be used as auxiliary support for the DTCH which is associated to the default bearer of the Internet APN). Otherwise, the UE may use LCID=<01001> (decimal 9).

The INITIAL message is an example of a second control message as described, e.g., in relation to the methods of FIGS. 5 and 6, and the HANDSHAKE message is an example of a second acknowledgement message as described, e.g., in relation to the methods of FIGS. 5 and 6.

The following processes, among others, may be used in certain examples of the methods and apparatuses described in relation to FIGS. 1-8.

Handling of Transactions with Higher Priority DTCHs (LCID=9)

In the event that RRC configures new resources for e.g. a dedicated Internet Protocol (IP) Multimedia Subsystem (IMS) Guaranteed Bit Rate (GBR) bearer such as Quality of Service (QoS) Class Indicator (QCI)=1 or QCI=2, peer parties continue with the PFT context but continuously adapt the priority and logical channel grouping of the PFT MAC extensions to the DTCH which has the highest priority.

In the event that the UE detects activity on a data radio bearer configuration mapped to logical channels with higher priority, the UE takes appropriate actions to adapt the PFT MAC extensions to that highest priority.

Interaction with the Logical Channel Prioritization Procedure (LCID=9)

In certain implementations, shortcuts can be made to realize a proper interaction with the Logical Channel Prioritization procedure. The shortcuts are typically consistent with the following relative priority in decreasing order (the logical channel mapped to the EPS bearer with highest priority is named Y):

MAC control element for C-RNTI or data from UL-CCCH;
MAC control element for BSR, with exception of BSR included for padding;
MAC control element for PHR, Extended PHR, or Dual Connectivity PHR;
Data from any Logical Channel DCCH;
Data from Y including MAC extensions;
Data from any Logical Channel DTCH, with lower priority than Y; and
MAC control element for BSR included for padding.

Figure 10:
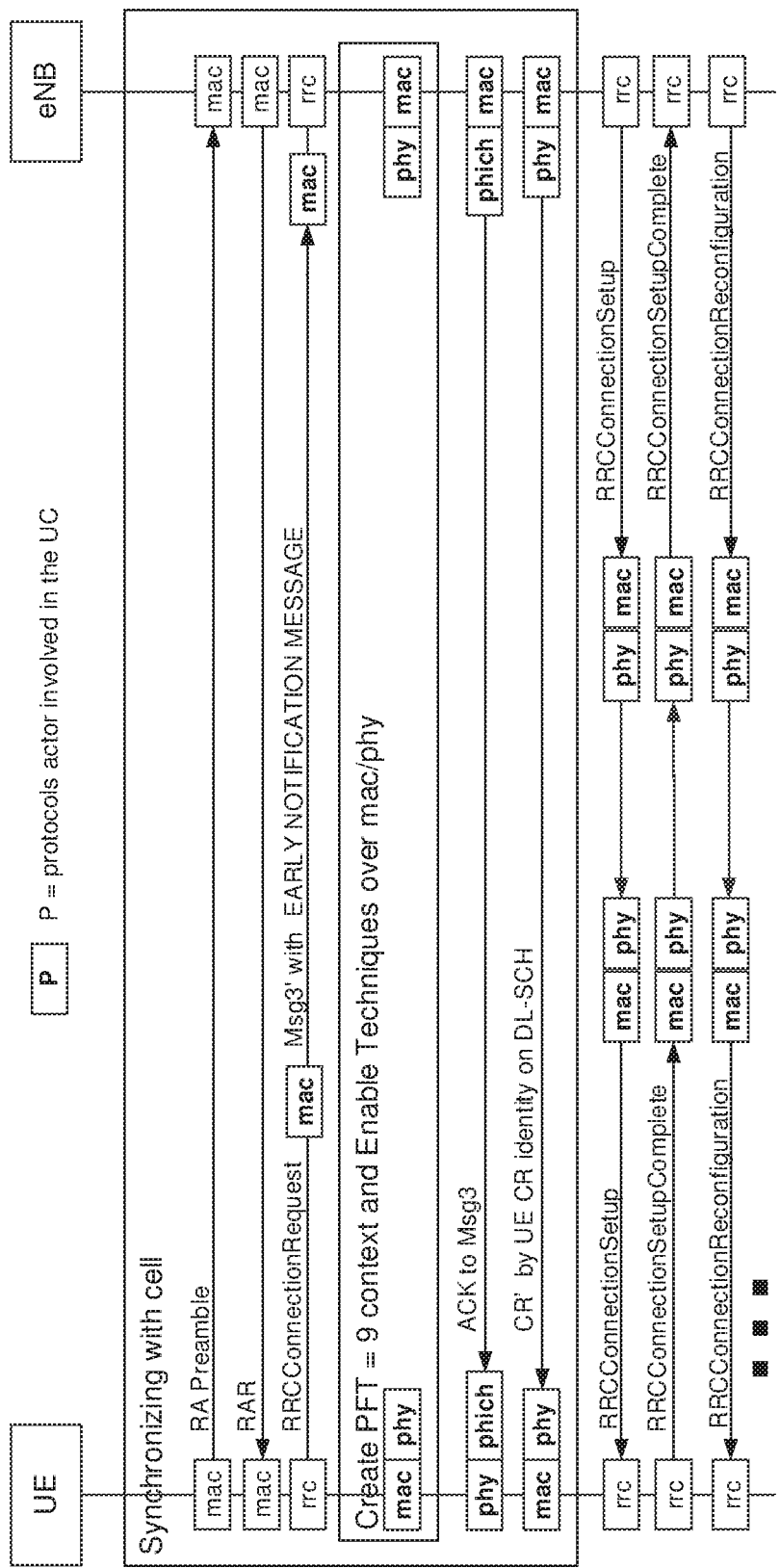
FIG. 10 is a signaling diagram illustrating communication between a UE and an eNB according to an embodiment of the disclosed subject matter.

FIG. 10 is a signaling diagram illustrating communication between a UE and an eNB according to an embodiment of the disclosed subject matter. More specifically, FIG. 10 shows an example of PFT establishment initiated by a UE. This example represents one potential context for implementing concepts such as those described in relation to FIGS. 1-8.

Referring to FIG. 10, the UE initiates by sending the EARLY NOTIFICATION message (size of message with subheader is 1 bytes) on LCD=<01001> (dec 9). This operation may constitute, e.g., S515 of FIG. 5, where the EARLY NOTIFICATION message is the "control message" of FIG. 5. In some embodiments, techniques for this and other operations may be enabled according to a pre-configuration that is hardwired in both peers.

The UE continues by indicating the PFT in an INITIAL message (size of message with subheader is 3 bytes). This operation may constitute, e.g., S530 of FIG. 5, where the INITIAL message is the "second control message" of FIG. 5. The network responds to the INITIAL message with a HANDSHAKE message (size of message with subheader is 3 bytes). This operation may constitute, e.g., S630 of FIG. 6, where the HANDSHAKE message is the "second acknowledgement message" of FIG. 6.

The UE typically does not initiate or continue the sequence of events unless it has a valid reception of the PRE-ANNOUNCEMENT message.

Figure 11:
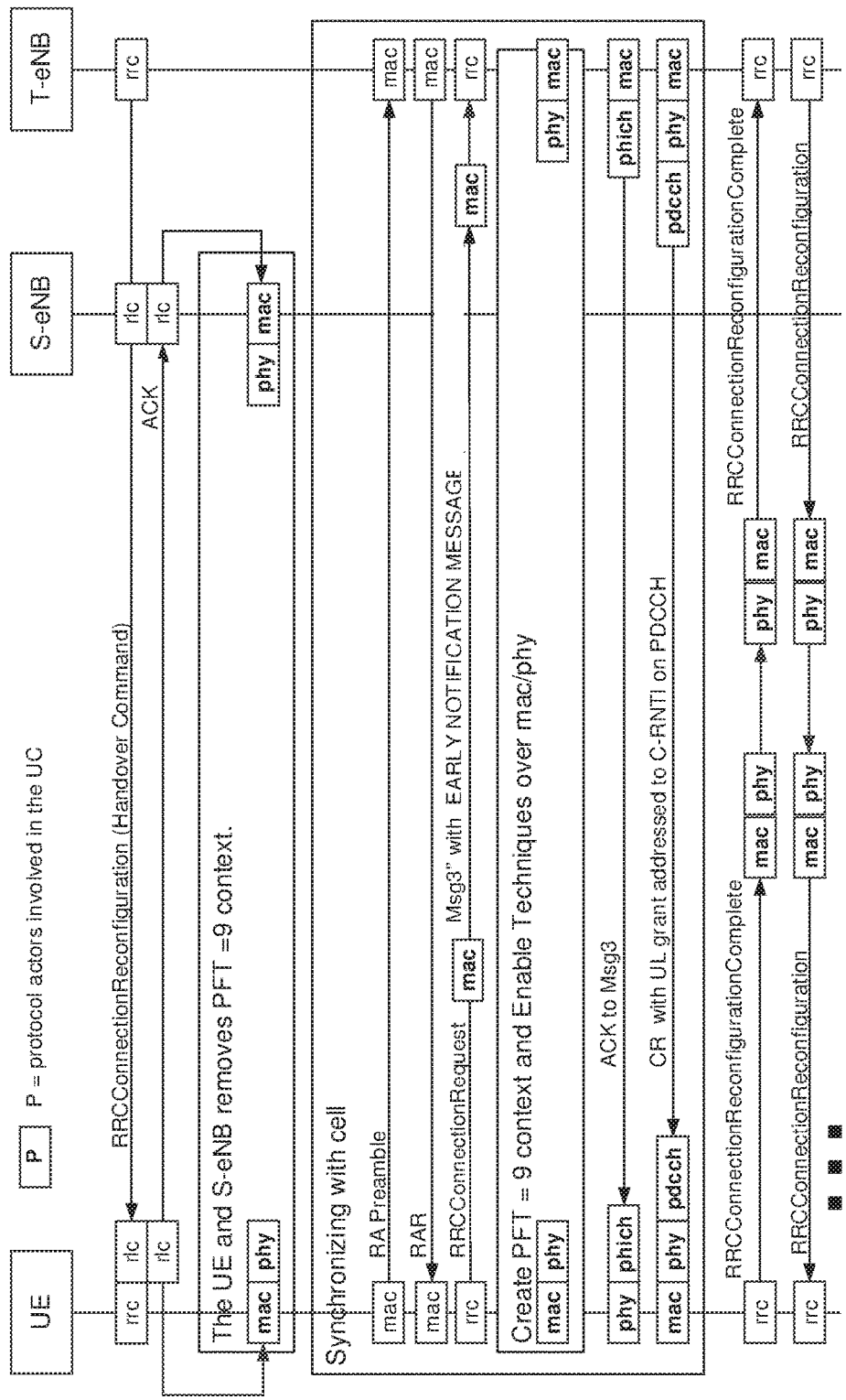
FIG. 11 is a signaling diagram illustrating communication between a UE and an eNB according to an embodiment of the disclosed subject matter.

FIG. 11 is a signaling diagram illustrating communication between a UE and an eNB according to an embodiment of the disclosed subject matter. More specifically, FIG. 11 shows an example of Handover with Establishment of PFT in a target cell.

Referring to FIG. 11, the UE releases the PFT=9 in the S-eNB and may reconnect PFT again in the target eNB (T-eNB) by using the EARLY NOTIFICATION MESSAGE (size of message with subheader is 1 byte). In some embodiments, techniques for this and other operations may be enabled according to a pre-configuration that is hardwired in both peers. The UE typically does not initiate or continue the sequence of events with the T-eNB unless it has a valid reception of the PRE-ANNOUNCEMENT message for the associated cell.

In addition to embodiments illustrated in FIGS. 10 and 11, another embodiment performs PFT establishment in the case of a radio link failure (RLF). A general process for performing PFT establishment in such instances would be apparent to those skilled in the art in view of the description presented above. In one situation, a UE reestablishes an RRC connection in a new cell, which includes PFT establishment. In an alternative situation, however, a UE reestablishes an RRC connection in the same cell, which excludes PFT establishment.

The following description presents various forms of information that may be used in relation to embodiments described above. For instance, FIGS. 12-16 show examples of certain messages and/or data structures referred to in FIGS. 10 and 11 and/or the related description.

Figure 12:
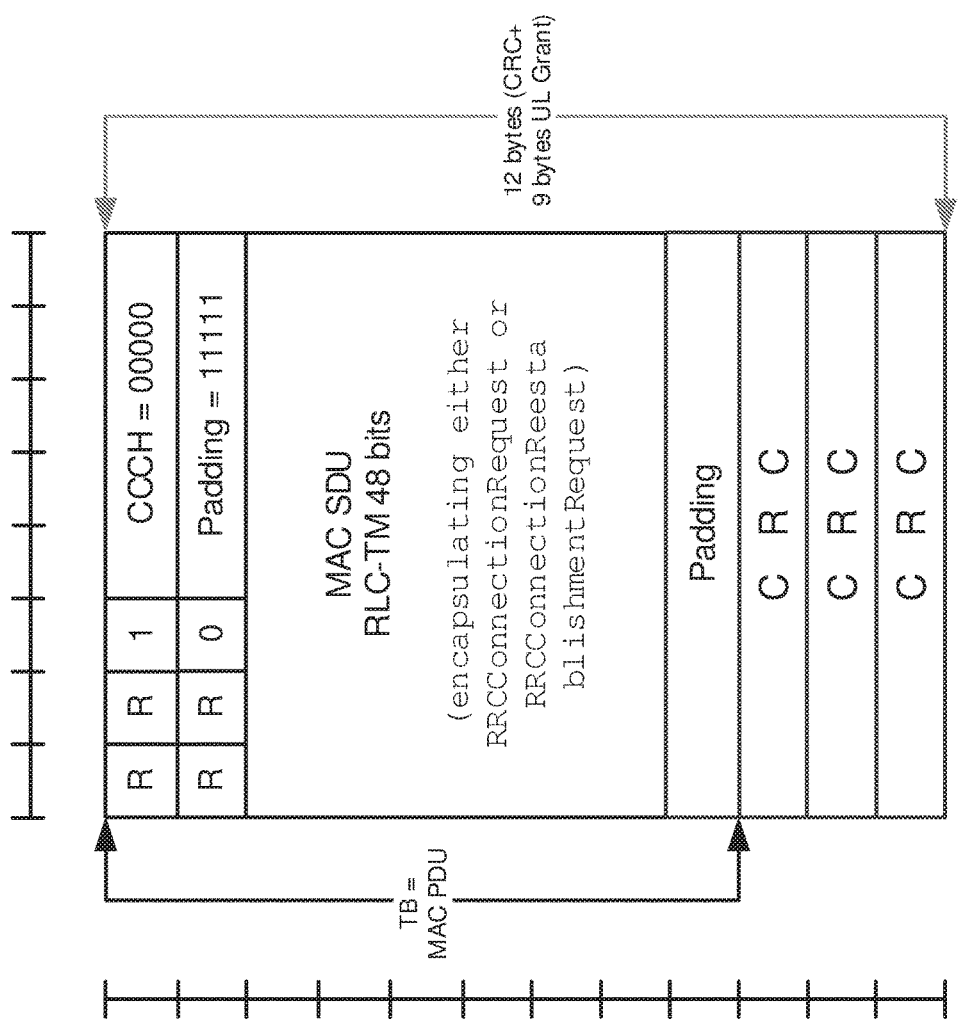
FIG. 12 shows a Msg3 used for initial access by the RRC sublayer in certain embodiments of the disclosed subject matter.

FIG. 12 shows a Msg3 used for initial access by the RRC sublayer in certain embodiments of the disclosed subject matter. In this example the message comprises 9 bytes, although the size and/or content may vary according to a UL grant.

Figure 13:
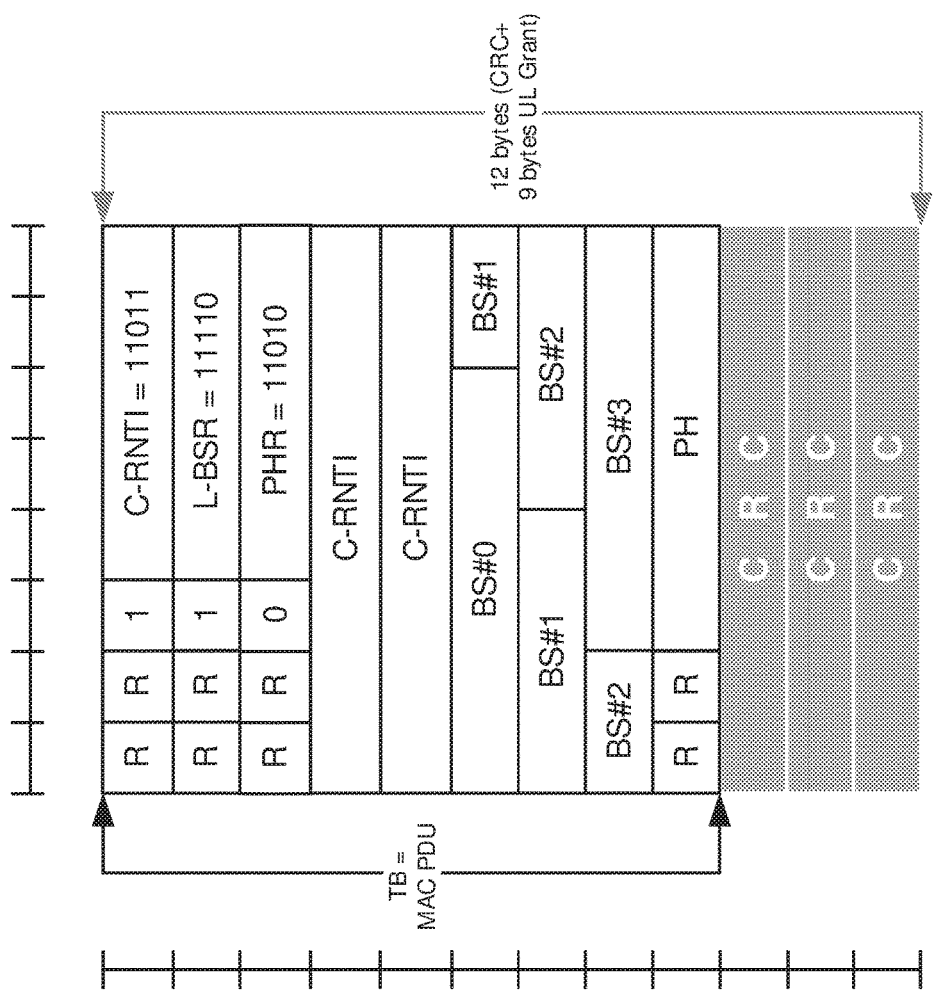
FIG. 13 shows an example Msg3 used by the MAC layer itself in certain embodiments of the disclosed subject matter.

FIG. 13 shows an example Msg3 used by the MAC layer itself in certain embodiments of the disclosed subject matter. In this example the message comprises 9 bytes, although the size and/or content may vary according to a UL grant.

Figure 14:
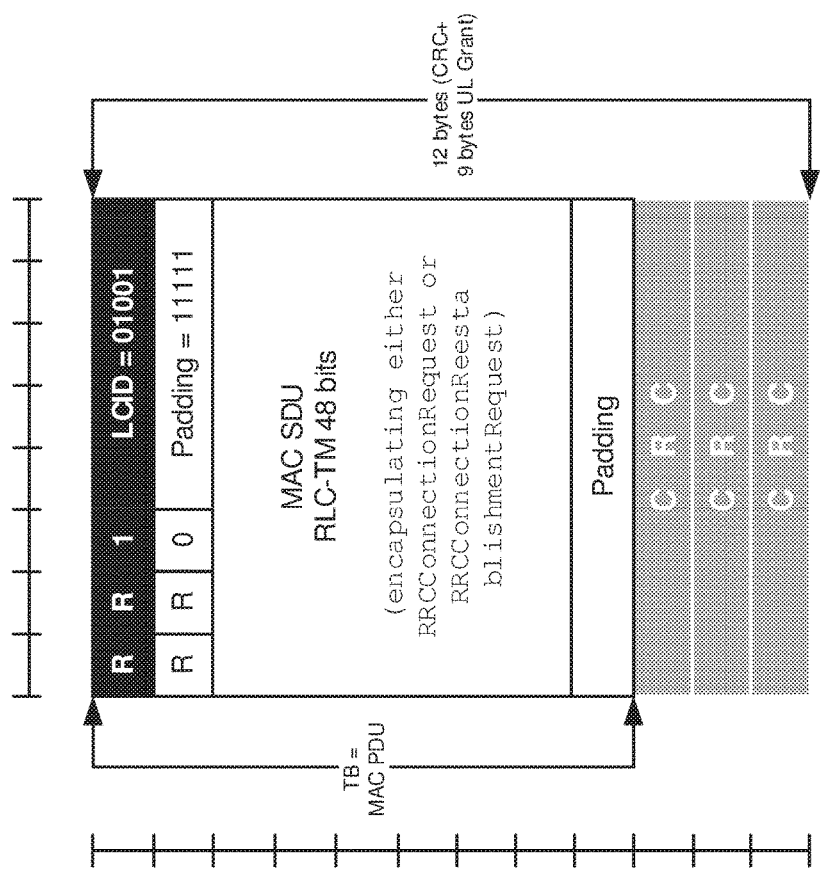
FIG. 14 shows an example Msg3' used in certain embodiments of the disclosed subject matter.

FIG. 14 shows an example Msg3' used in certain embodiments of the disclosed subject matter. In this example the message comprises 9 bytes, although the size and/or content may vary according to a UL grant.

Figure 15:
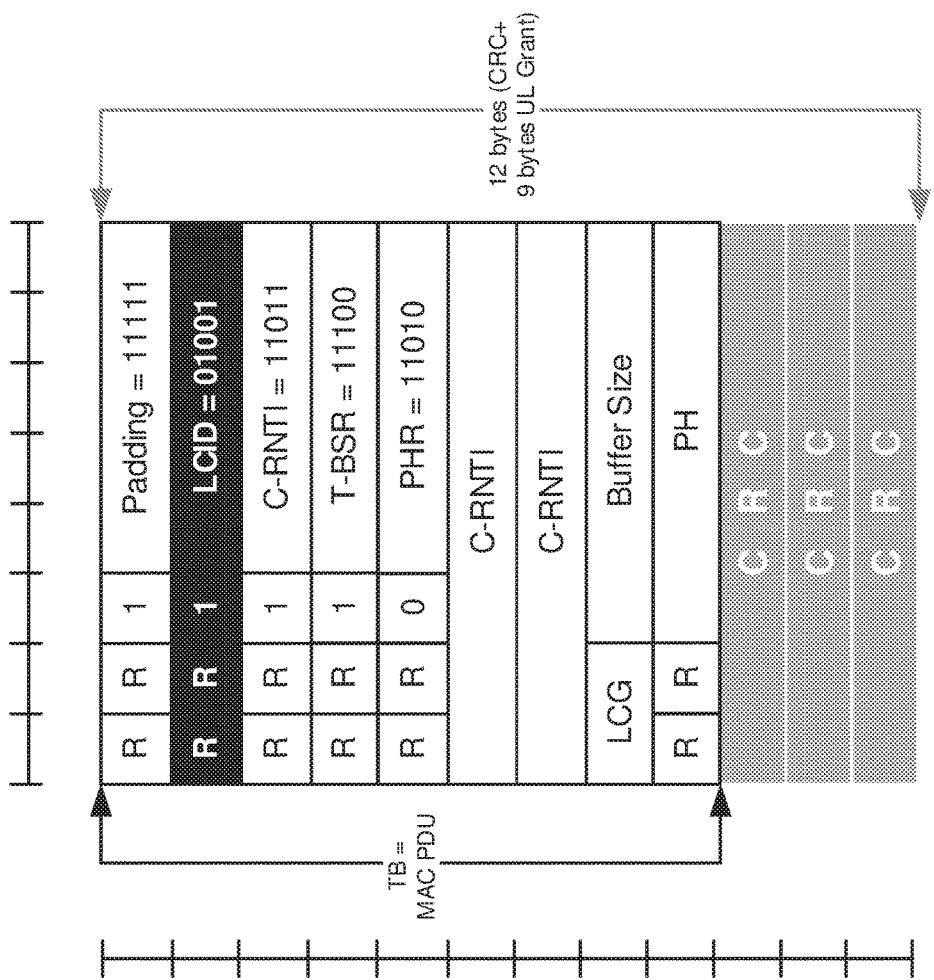
FIG. 15 shows an example Msg3" used in certain embodiments of the disclosed subject matter.

FIG. 15 shows an example Msg3" used in certain embodiments of the disclosed subject matter. In this example the message comprises 9 bytes, although the size and/or content may vary according to a UL grant.

Figure 16:
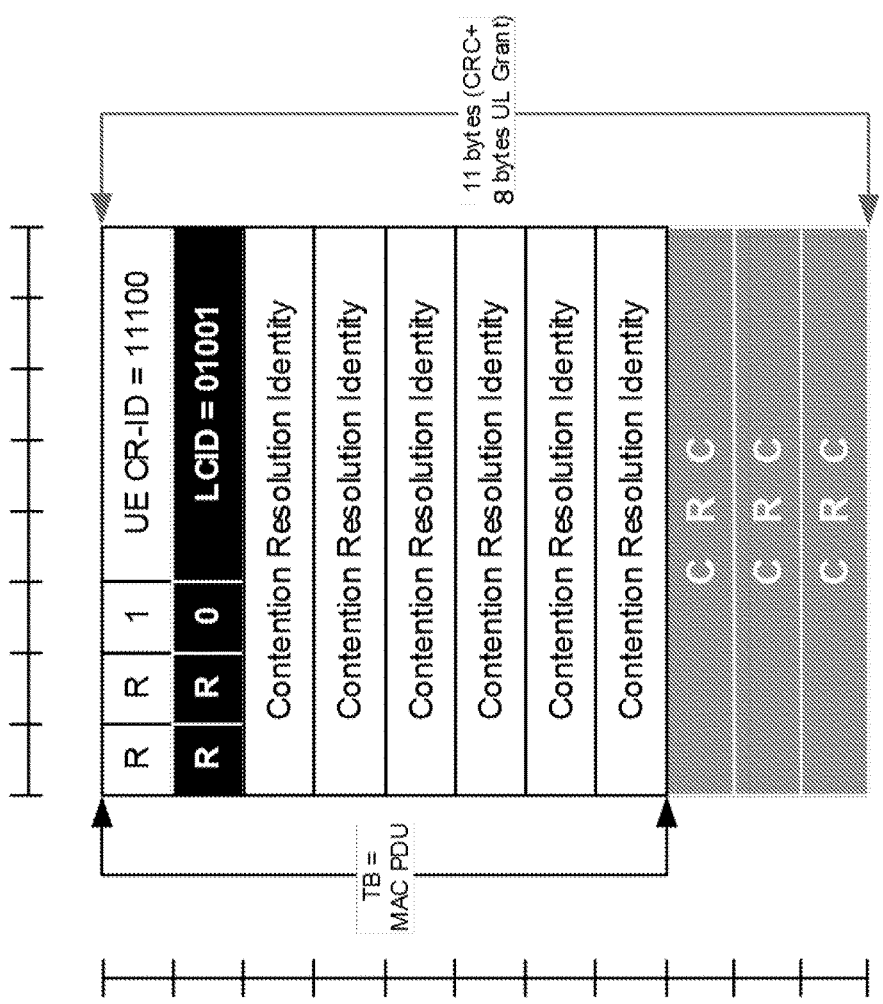
FIG. 16 shows an example CR' used in certain embodiments of the disclosed subject matter.

FIG. 16 shows an example CR' used in certain embodiments of the disclosed subject matter. In this example the message comprises 8 bytes, although the size and/or content may vary according to a size of a transport block (TB) and common control channel (CCCH) concatenation.

The following description presents various forms of information using Abstract Syntax Notation One (ASN.1) and related explanations.

PreAnnouncementBlockType1 is an information element (IE) that defines the content of an example PRE-ANNOUNCEMENT message. The block is used for PFT=LCID=9 with exclusivity in some embodiments.

| PreAnnouncementBlockType1 IE |
|---|
| -- ASN1START<br>PreAnnouncementBlockType1 ::=   SEQUENCE {<br>  N-TSVN                                 BIT STRING (SIZE (8)),<br>  SupportedPFTList        SEQUENCE (SIZE (1..maxSupportedPFTs)) OF BIT STRING (SIZE (7)),<br>  NonCriticalExtension SEQUENCE { }<br>  OPTIONAL        -- Need OP<br>}<br>-- ASN1STOP |

| SystemInformationBlockType2 field descriptions |
|---|
| N-TSVN |
| Identifies the type and software version number of the network equipment. Its length is 8 bits. |
| SupportedPFTList |
| Specifies in a list of 7 bits the PFT values supported. The length of list is 1 and it contains the value 0001001 (PFT = 9) in current version of specification. |

Hysteresis is an IE that is used to discriminate the dedicated ANNOUNCEMENT message. The value of this IE is set to 30 (which is 15 dB according to mapping equation in 3GPP TS 36.331).

| Hysteresis IE |
|---|
| -- ASN1START<br>Hysteresis ::=                INTEGER (0..30)<br>-- ASN1STOP |

ReportConfigEUTRA is an IE that contains a few parts that are used either to discriminate the dedicated ANNOUNCEMENT MESSAGE or to define its content. The trigger type is one part of a 5-tuple used to discriminate the message. It is set to event. The selection of reporting event is another part of the discriminator. It is set to eventA2, which occurs where serving becomes worse than an absolute threshold.

Further parts that are used to discriminate the dedicated ANNOUNCEMENT message include the IE ThresholdEUTRA, where a choice is set to RSRP-Range, the IE RSRP Range where the value is set to 1 and also the IE Hysteresis which is set to 30. This setting of threshold and hysteresis makes sure that this Event A2 will not trigger measurement reporting. Remaining parts of the code space are used to define N-TSVN and Minimum-PFT.

FIG. 17 shows an ASN.1 description for a ReportConfigEUTRA IE according to an embodiment of the disclosed subject matter.

| ReportConfigEUTRA field descriptions (shortlist for the dedicated ANNOUNCEMENT MESSAGE) |
|---|
| eventId |
| This IE is used to discriminate the dedicated ANNOUNCEMENT MESSAGE. Set to eventA2. |
| Hysteresis |
| This IE is used to discriminate the dedicated ANNOUNCEMENT MESSAGE. Set to 30. |
| maxReportCells |
| This code space is used by the dedicated ANNOUNCEMENT MESSAGE. The 1 bit code space associated the ASN.1 coding of a value in range "INTEGER (1..maxCellReport)" is used as 3 of 7 bits in the variable Minimum-PFT; the 1st, 2nd and 3rd least significant bits. |
| reportAmount |
| This code space is used by the dedicated ANNOUNCEMENT MESSAGE. The 3 bit code space associated the ASN.1 coding of a value in range "ENUMERATED {r1, r2, r4, r8, r16, r32, r64, infinity}" is used as 3 of 7 bits in the variable Minimum-PFT; the 4th, 5th and 6th next-least significant bits. |
| reportInterval |
| This code space is used by the dedicated ANNOUNCEMENT MESSAGE. The 4 bits associated the ASN.1 coding of this IE is used to encode the 4 most significant bits of N-TSVN. |

| ReportConfigEUTRA field descriptions (shortlist for the dedicated ANNOUNCEMENT MESSAGE) |
| --- |
| reportQuantity |
| This code space is used by the dedicated ANNOUNCEMENT MESSAGE. The 1 bit code space associated the ASN.1 coding of a value in range "ENUMERATED {sameAsTriggerQuantity, both}" is used as 1 of 7 bits in the variable Minimum-PFT; the 5th next-least significant bit. RSRP-Range |
| This IE is used to discriminate the dedicated ANNOUNCEMENT MESSAGE. Set to 1. ThresholdEUTRA |
| This IE is used to discriminate the dedicated ANNOUNCEMENT MESSAGE. Set to RSRP-Range. TimeToTrigger |
| This code space is used by the dedicated ANNOUNCEMENT MESSAGE. The 4 bits associated the ASN.1 coding of this IE is used to encode the 4 least significant bits of N-TSVN. triggerQuantity |
| This code space is used by the dedicated ANNOUNCEMENT MESSAGE. The 1 bit code space associated the ASN.1 coding of a value in range "ENUMERATED {rsrp, rsrq}" is Reserved. |

| Conditional presence | Explanation |
| --- | --- |
| CSI-RS | The field is not present in the dedicated ANNOUNCEMENT MESSAGE and the UE shall delete any existing value for this field. |
| Periodic | The field is not present in the dedicated ANNOUNCEMENT MESSAGE and the UE shall delete any existing value for this field. |
| reportCGI | The field is not present in the dedicated ANNOUNCEMENT MESSAGE and the UE shall delete any existing value for this field. |
| Event | The field is mandatory in the dedicated ANNOUNCEMENT MESSAGE and eventId is set to eventA2. |
| a3OrA5 | The field is not present in the dedicated ANNOUNCEMENT MESSAGE and the UE shall delete any existing value for this field. |

Figure 18:
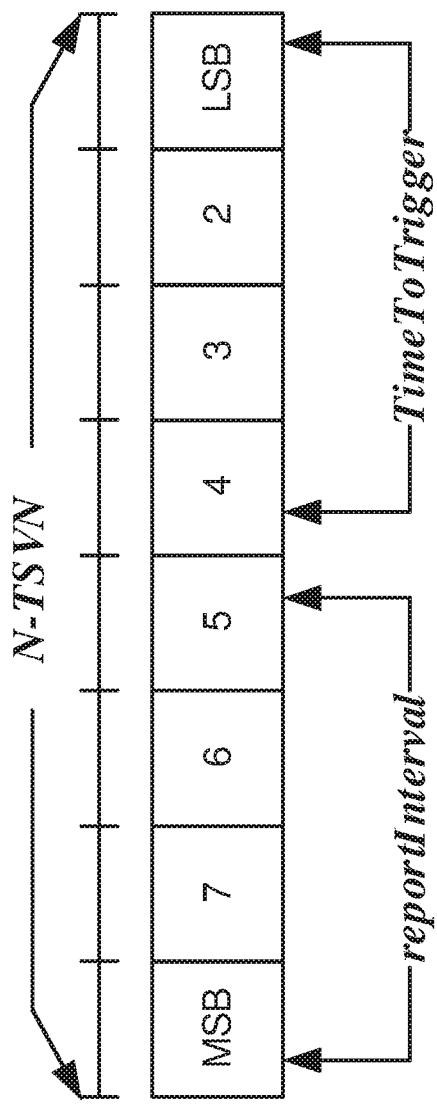
FIG. 18 is a diagram illustrating how to aggregate 8 bits used to encode N-TSVN in a dedicated ANNOUNCEMENT message.

FIG. 18 illustrates how to aggregate the 8 bits used to encode N-TSVN in the dedicated ANNOUNCEMENT message.

Figure 19:
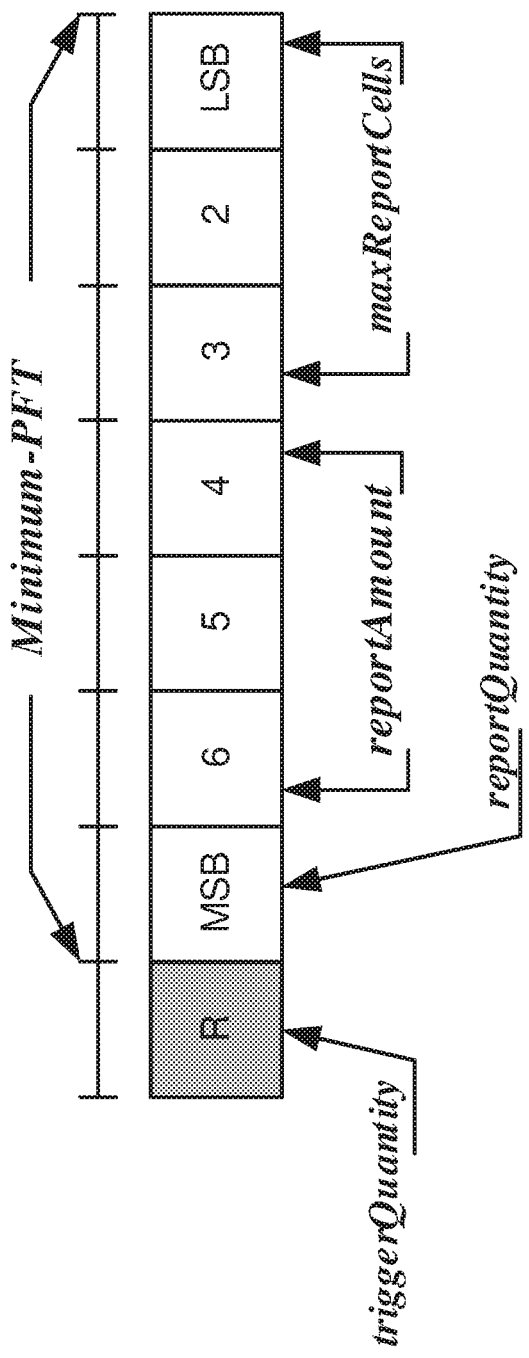
FIG. 19 illustrates how to aggregate 7 bits used to encode a Minimum-PFT in a dedicated ANNOUNCEMENT message.

FIG. 19 illustrates how to aggregate 7 bits used to encode the Minimum-PFT in the dedicated ANNOUNCEMENT message.

A code space of a ReportInterval IE is used by the dedicated ANNOUNCEMENT MESSAGE. Four (4) bits associated with an ASN.1 coding of this IE is used to encode 4 most significant bits of N-TSVN.

| ReportInterval IE |
| --- |
| -- ASN1START<br>ReportInterval ::=ENUMERATED {<br>    ms120, ms240, ms480, ms640, ms1024,<br>    ms2048, ms5120, ms10240, min1, min6,<br>    min12, min30, min60, spare3, spare2, spare1}<br>-- ASN1STOP |

An RSRP-Range IE is one part that is used to discriminate the dedicated ANNOUNCEMENT message. The value of this IE is set to 1 (which is −140≤RSRP<−139 dBm according to mapping table "RSRP Measurement Report Mapping" in TS 36.133).

| RSRP-Range IE |
| --- |
| -- ASN1START<br>    RSRP-Range ::=    INTEGER(0..97)<br>-- ASN1STOP |

The code space of a TimeToTrigger IE is used by the dedicated ANNOUNCEMENT MESSAGE. Four (4) bits associated the ASN.1 coding of this IE is used to encode the 4 least significant bits of N-TSVN.

| TimeToTrigger information element |
| --- |
| -- ASN1START<br>TimeToTrigger ::=    ENUMERATED {<br>    ms0, ms40, ms64, ms80, ms100,<br>    ms128, ms160, ms256, ms320,<br>    ms480, ms512, ms640, ms1024,<br>    ms1280, ms2560, ms5120}<br>-- ASN1STOP |

The following ASN.1 description shows examples of RRC multiplicity and type constraint values.

| Multiplicity and Type Constraint Definitions |
| --- |
| -- ASN1START<br><br>...<br>maxCellReport    INTEGER ::= 8      -- Maximum number of reported cells/CSI-RS resources<br>maxSupportedPFTs  INTEGER ::= 128    -- Maximum number of supported PFT<br>...<br>-- ASN1STOP |

The following is an example ASN.1 trace-out for an ANNOUNCEMENT message from an eNB.

```
reportconfigtoaddmodlist =
[#'rrc-reportconfigtoaddmod'{
   reportconfigid = 1,
   reportconfig =
     {reportconfigeutra,
      #'rrc-reportconfigeutra'{
       triggertype =
         {event,
          #'rrc-reportconfigeutra_triggertype_event'{
           eventid =
             {eventa2,
              #'rrc-reportconfigeutra_triggertype
```

As indicated by the foregoing, certain embodiments of the disclosed subject matter provide methods and apparatus that can be used to facilitate scheduling, power control and link adaptation according to agreements between a UE and a network. The described embodiments may provide potential benefits such as reduced power consumption and/or latency.

While the disclosed subject matter has been presented above with reference to various embodiments, it will be understood that various changes in form and details may be made to the described embodiments without departing from the overall scope of the disclosed subject matter.

The invention claimed is:

1. A method in a wireless communication device, comprising:
   transmitting a control message indicating a request for initial device and application-specific configuration parameters for a connection with a radio access node;
   receiving acknowledgement of the control message from the radio access node responsive to the control message; and
   applying the initial device and application-specific configuration parameters for the connection in response to receiving the acknowledgement.

2. The method of claim 1, further comprising:
   receiving a broadcasted message specifying a type and software version of the radio access node and a list of device and application specific functions supported by the radio access node;
   verifying compatibility of the specified type and software version of the radio access node with the wireless communication device; and
   transmitting the control message in response to verifying the compatibility.

3. The method of claim 2, further comprising transmitting a second control message indicating a request to use at least one of the listed device and application specific functions and to engage in a protocol associated with the at least one of the listed device and application specific functions.

4. The method of claim 3, further comprising receiving an acknowledgment of the second control message from the radio access node responsive to the request in the second control message, and applying the protocol associated with the at least one of the device and application-specific functions.

5. The method of claim 1, wherein the control message is a Msg3 in a random access procedure for initial access to the radio access node.

6. The method of claim 1, wherein the control message is a Msg3 in a random access procedure for handover from a source eNodeB to a target eNodeB.

7. The method of claim 1, wherein the control message is a Msg3 having a header with a logical channel identifier (LCID) selected from among 9, 10, 22, 23, 28, 29 and 30.

8. The method of claim 1, wherein the initial device and application specific configuration parameters control at least one of scheduling, power consumption, and link adaptation.

9. The method of claim 3, wherein the second control message further indicates at least one capability, type, and software version of the wireless communication device.

10. A method in a radio access node, comprising:
    transmitting a broadcasted message specifying a type and software version of the radio access node and a list of device and application-specific functions supported by the radio access node;
    receiving from a wireless communication device, in response to the broadcasted message, a control message indicating a request for initial device and application-specific configuration parameters for a connection with the wireless communication device;
    transmitting an acknowledgement of the control message to the wireless communication device in response to the control message; and
    applying the initial device and application-specific configuration parameters for the connection in response to receiving the control message.

11. The method of claim 10, further comprising receiving a second control message from the wireless communication device indicating a request to use at least one of the listed device and application specific functions and to engage in a protocol associated with the at least one of the listed device and application specific functions.

12. The method of claim 11, further comprising transmitting an acknowledgment of the second control message to the wireless communication device in response to the request in the second control message, and applying the protocol associated with the at least one of the device and application-specific functions.

13. The method of claim 10, wherein the control message is a Msg3 in a random access procedure for initial access to the radio access node.

14. The method of claim 10, wherein the control message is a Msg3 in a random access procedure for handover from a source eNodeB to a target eNodeB.

15. The method of claim 10, wherein the control message is a Msg3 having a header with a logical channel identifier (LCID) selected from among 9, 10, 22, 23, 28, 29 and 30.

16. The method of claim 10, wherein the initial device and application specific configuration parameters control at least one of scheduling, power consumption, and link adaptation.

17. The method of claim 11, wherein the second control message further indicates at least one capability, type, and software version of the wireless communication device.

18. A wireless communication device, comprising:
a transmitter configured to transmit a control message indicating a request for initial device and application-specific configuration parameters for a connection with a radio access node;
a receiver configured to receive acknowledgement of the control message from the radio access node responsive to the control message; and
a processor configured to apply the initial device and application-specific configuration parameters for the connection in response to receiving the acknowledgement.

19. The wireless communication device of claim 18, wherein the receiver is further configured to receive a broadcasted message specifying a type and software version of the radio access node and a list of device and application specific functions supported by the radio access node;
wherein the processor is further configured to verify compatibility of the specified type and software version of the radio access node with the wireless communication device; and
wherein the transmitter is further configured to transmit the control message in response to verifying the compatibility.

20. The wireless communication device of claim 19, wherein the transmitter is further configured to transmit a second control message indicating a request to use at least one of the listed device and application specific functions and to engage in a protocol associated with the at least one of the listed device and application specific functions.

21. The wireless communication device of claim 20, wherein the receiver is further configured to receive an acknowledgment of the second control message from the radio access node responsive to the request in the second control message, and the processor is further configured to apply the protocol associated with the at least one of the device and application-specific functions.

22. The wireless communication device of claim 18, wherein the control message is a Msg3 in a random access procedure for initial access to the radio access node.

23. The wireless communication device of claim 18, wherein the control message is a Msg3 in a random access procedure for handover from a source eNodeB to a target eNodeB.

24. The wireless communication device of claim 18, wherein the control message is a Msg3 having a header with a logical channel identifier (LCID) selected from among 9, 10, 22, 23, 28, 29 and 30.

25. A radio access node, comprising:
a transmitter configured to transmit a broadcasted message specifying a type and software version of the radio access node and a list of device and application-specific functions supported by the radio access node;
a receiver configured to receive from a wireless communication device, in response to the broadcasted message, a control message indicating a request for initial device and application-specific configuration parameters for a connection with the wireless communication device;
the transmitter being further configured to transmit an acknowledgement of the control message to the wireless communication device in response to the control message; and
at least one processor configured to apply the initial device and application-specific configuration parameters for the connection in response to receiving the control message.

26. The radio access node of claim 25, wherein the receiver is further configured to receive a second control message from the wireless communication device indicating a request to use at least one of the listed device and application specific functions and to engage in a protocol associated with the at least one of the listed device and application specific functions.

27. The radio access node of claim 26, wherein the transmitter is further configured to transmit an acknowledgment of the second control message to the wireless communication device in response to the request in the second control message, and the processor is further configured to apply the protocol associated with the at least one of the device and application-specific functions.

28. The radio access node of claim 25, wherein the control message is a Msg3 in a random access procedure for initial access to the radio access node.

29. The radio access node of claim 25, wherein the control message is a Msg3 in a random access procedure for handover from a source eNodeB to a target eNodeB.

30. The radio access node of claim 25, wherein the control message is a Msg3 having a header with a logical channel identifier (LCID) selected from among 9, 10, 22, 23, 28, 29 and 30.

* * * * *